Nov. 7, 1939.  H. C. BRIGGS  2,178,555
SAFETY MECHANISM FOR IMPROVING THE DIRIGIBILITY
OF SHIPS, SUBMARINES, AND AIRCRAFT
Filed Oct. 10, 1936  6 Sheets-Sheet 1

INVENTOR.
Henry C. Briggs,
BY John Q. Grady
ATTORNEY.

Patented Nov. 7, 1939

2,178,555

UNITED STATES PATENT OFFICE 2,178,555

SAFETY MECHANISM FOR IMPROVING THE DIRIGIBILITY OF SHIPS, SUBMARINES, AND AIRCRAFT

Henry C. Briggs, Brooklyn, N. Y.

Application October 10, 1936, Serial No. 105,112

11 Claims. (Cl. 115—35)

My invention relates broadly to navigation of ships, submarines and aircraft and more particularly to safety mechanism for improving the dirigibility of ships, submarines and aircraft.

One of the objects of my invention is to provide an improved construction of navigation control mechanism by which steering of large vessels, submarine boats, and aircraft may be facilitated.

Another object of my invention is to provide an arrangement of navigation mechanism for vessels wherein means are associated with the rudder mechanism for variably displacing the fluid medium in which the vessel is navigated directly through the rudder for facilitating steering of the vessel under control of the rudder mechanism.

Still another object of my invention is to provide a construction of rudder mechanism for vessels in which one or more auxiliary propellers are disposed within the rudder and operated independently of the main propeller for facilitating the steering of the vessel.

A further object of my invention is to provide a compartment within the hollow rudder of a vessel, which compartment may be opened or closed from a control position aboard the vessel for rendering effective or ineffective an auxiliary propeller mechanism carried by the rudder.

A still further object of my invention is to provide a construction of orienting mechanism for an auxiliary propeller arranged for facilitating the navigation of vessels whereby the propeller may be shifted to any desired operating plane for acting upon the fluid medium for developing the component of the forces necessary for the proper steering of the vessel.

Another object of my invention is to provide an arrangement of conduits through the hull of a vessel or through the rudder with means for displacing the fluid medium through the conduits for developing forces controllable for navigating the vessel.

A further object of my invention is to provide a method of constructing a vessel having means associated with compartments in the vessel for displacing the fluid medium at positions along the vessel for facilitating the navigation of the vessel.

A still further object of my invention is to provide an arrangement of turbines constructed for directly acting upon the fluid medium for maneuvering a vessel in the fluid medium independently of the main propulsion system.

Other and further objects of my invention reside in the application of the orientation structure for propelling mechanism as applied to vessels, submarines and aircraft navigation as set forth more fully in the specification hereinafter following by reference to the accompanying drawings in which:

Figure 1:
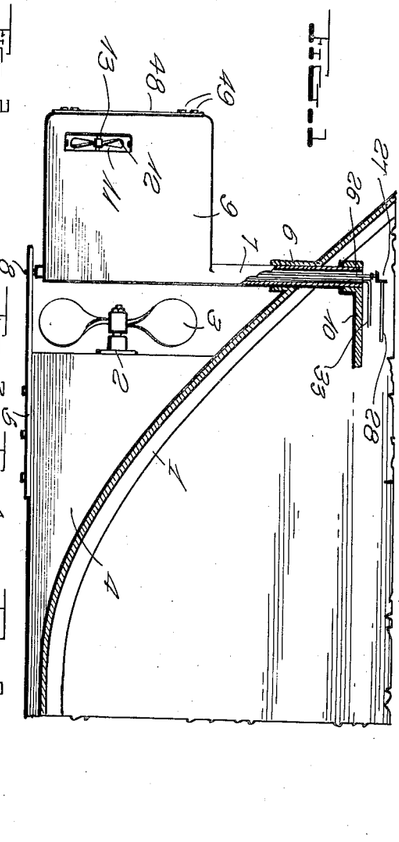
Figure 1 illustrates the stern of a vessel provided with a hollow rudder equipped with the auxiliary propelling mechanism of my invention.
Figures 2, 3, 7:
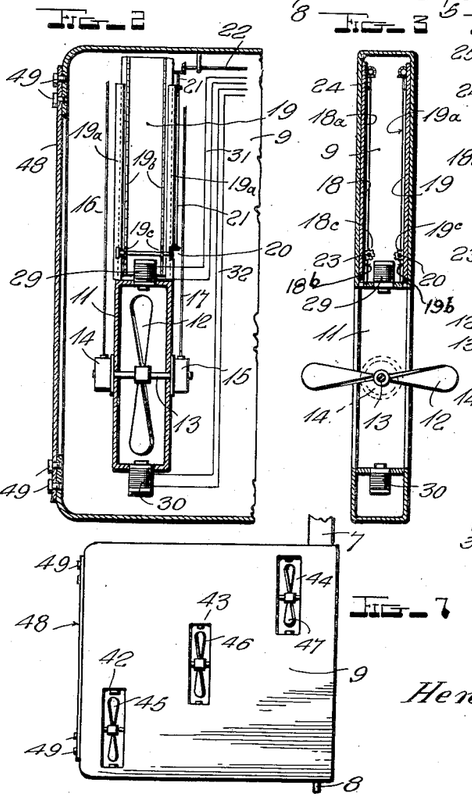
Fig. 2 is a central vertical longitudinal sectional view of a portion of a hollow rudder on an enlarged scale showing the auxiliary propeller mechanism mounted therein.
Fig. 3 is a transverse vertical sectional view through the hollow rudder with the doors illustrated in elevated position and the propeller in operation.
Fig. 7 shows a form of my invention in which a plurality of propellers are arranged in off-set relation in the hollow rudder, each propeller being adapted to cut into the water at different horizontal levels.
Figures 4, 5, 6:
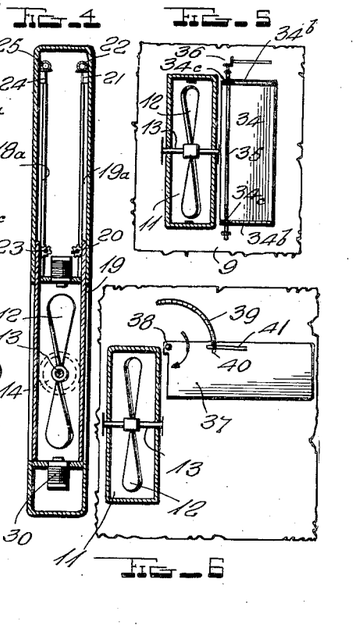
Fig. 4 is a view similar to Fig. 3 with the doors closed and the propeller housed within the hollow rudder.
Fig. 5 shows a modified arrangement of sliding doors for closing the propeller housing in the hollow rudder.
Fig. 6 shows a further modification of the door closing arrangement for the propeller housing in the hollow rudder.
Figure 8:
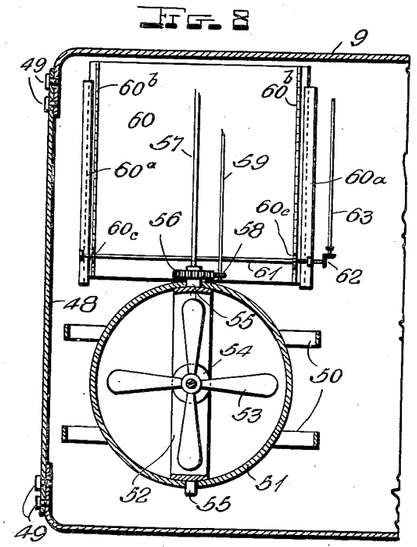
Fig. 8 illustrates a further modification of my invention in which orienting means are provided for selectively positioning the auxiliary propeller in a desired operating plane.
Figure 9:
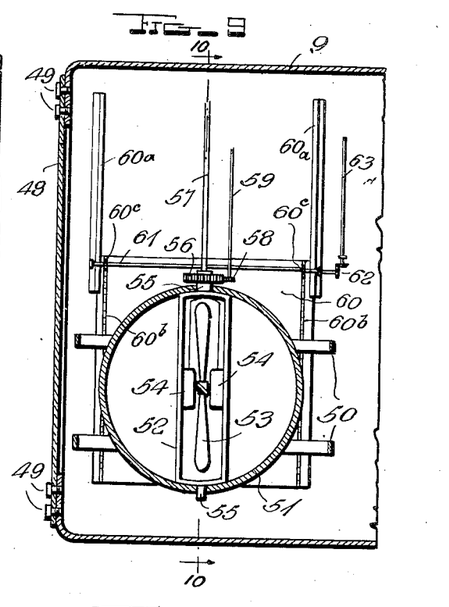
Fig. 9 is a view similar to Fig. 8 showing the propeller mechanism oriented in a plane substantially normal to the plane of the hollow rudder.

Referring to the drawings in more detail, reference character 1 designates the hull of a vessel which may be of various types or constructions and in which there is arranged a stern bearing 2 for journaling the main propeller 3. The skeg or deadwood is indicated at 4. The rudder shoe securing to the skeg or deadwood is indicated at 5. A stuffing box 6 is provided in the hull of the vessel through which the rudder post 7 extends. The rudder post 7 is pivoted or journaled at 8 in the rudder shoe 5. The rudder shown at 9 is of hollow construction, as will be pointed out hereinafter in more detail. A quadrant 10 is connected with the upper end of the rudder post 7 for operation from tiller cables leading to the wheel house. The hollow rudder 9 is provided with a housing 11 within which the auxiliary navigating or maneuvering propeller 12 is located. The propeller 12 is constructed from magnetic material but is electrolytically coated to avoid rust and corrosion due to submergence in salt water. The propeller 12 is mounted on shaft 13 which extends coaxially with the longitudinal axis of the rudder 9 and is journaled in the rudder 9 on opposite sides of the closures formed by the wall sections of housing 11. Motors 14 and 15 are mounted within the hollow rudder 9 and connect with shaft 13 for rotatably driving shaft 13 and correspondingly driving propeller 12. Shaft 13 may be driven by transmission machinery by way of hollow rudder-post 7. Two of the two-bladed propellers may be used, one starting a quarter-turn before the other, thereby giving the effect of one four-bladed propeller. Wherever I mention a propeller, a compartment, a turbine, etc., I do not mean to preclude the use of more than one such. Cables 15 and 16 extend from the motors 14 and 15 and through the rudder post 7 to the control position on the vessel. The housing 11 extends laterally through the hollow rudder 9 and may be closed when the propeller 12 is in the vertical position as indicated in Fig. 4 by means of two slidable doors which I have indicated at 18 and 19. The sliding doors 18 and 19 are each guided in their vertically adjustable path by means of sets of rails 18a and 19a, respectively. Each door or gate is provided with a pair of toothed racks 18b and 19b, extending longitudinally thereof in the rear of the gates or doors. The sets of racks 18b and 19b are engaged by and driven by sets of pinions 18c and 19c, respectively. The sets of pinions 18c and 19c, are carried by drive shafts 20 and 23, suitably journaled in the hollow rudder 9. Bevel gears carried by the drive shafts 20 and 23 mesh with coacting bevel gears carried by shafts 21 and 24. The shafts 21 and 24 may be suitably driven through bevel gears carried by shafts 22 and 25 which lead to corresponding bevel gears and shaft sections, one of which I have indicated at 26 in Fig. 1, connected through bevel gears 27 to control shaft 28 leading to the control position aboard the ship. Shafts 22 and 25, may be simultaneously controlled from the control position aboard the ship to operate the sets of pinions and open or close the doors or gates 18 and 19 to allow free passage of fluid through housing 11 and permit operation of auxiliary propeller 12. When the doors or gates are wholly withdrawn to open housing 11, the doors or gates lie directly adjacent the parallel extending interior flat walls of the hollow rudder 9, as indicated in Fig. 3. In closing the gates 18 and 19 it is necessary that propeller 12 be disposed in a vertical position. This may be accomplished by means of the arrangement of electro-magnetic devices 29 and 30, disposed at diametrically opposite positions, projecting through the opposite walls of housing 11 in positions in which the electro-magnetic devices act upon the magnetic vanes of the propeller 12 so that the propeller 12 is brought to rest as the propeller gradually ceases to rotate, after driving power is removed, in the position illustrated in Fig. 4. The control circuits for the electro-magnetic devices 29 and 30 are shown at 31 and 32. The cables 16, 17, 31 and 32 are combined in a unitary cable indicated at 33 and brought upwardly through hollow rudder post 7 to the control position aboard the vessel. It will be understood that the circuits 31 and 32 are only momentarily energized sufficient to cause excitation of the electro-magnetic devices 29 and 30 for such period of time as will serve to bring the propeller 12 to rest in a position wholly within the limits of the walls of the hollow rudder 9.

In lieu of the flat slidable doors 18 and 19, I may provide doors as represented in Fig. 5 adapted to slide laterally into a position closing the housing 11. In this arrangement flat slidable doors 34 are provided, each having toothed racks 34b cut in the rear surface thereof adapted to be engaged by pinions 34c, carried by a shaft 35 suitably journaled with respect to the hollow rudder 9 and operated through control shaft 36 suitably connected to a shaft similar to the shaft 26 in Fig. 1, which is in turn connected through gearing 27 with control shaft 28.

In lieu of the arrangement of sliding doors, I may provide pivotally mounted doors as shown generally at 37 in Fig. 6. The doors may be pivoted at 38 with respect to hollow rudder 9. Each door may carry an arcuate shaped rack 39 adapted to be engaged by a pinion 40 carried by shaft 41 which may be suitably connected with gear system 27 and control shaft 28 for remotely controlling the opening and closing of the doors in the hollow rudder 9.

Various other forms of door opening and closing means operative from the control position aboard the vessel may be employed and I intend no limitations upon the particular construction or manner of adjustment of the doors which may be employed.

In certain classes of vessels it is desirable to increase the effectiveness of the propelling mechanism carried within the hollow rudder and for this purpose, I may employ a multiplicity of propellers mounted within the hollow rudder as indicated generally in Fig. 7. In this form of my invention I have shown laterally disposed housings 42, 43 and 44 disposed in step-like arrangement in the hollow rudder 9. Separate propellers 45, 46 and 47 are arranged in the housings 42, 43 and 44. The propellers 45, 46 and 47 are each constructed from magnetic material so that the propellers may be brought to rest by magnetic means in positions housed well within the hollow rudder to permit closing of the doors adjacent each of the housings. The doors are arranged on that side of the respective housings which allows the withdrawal and advancement of the doors. That is to say, in the structure shown in Fig. 7 the door closing means for housing 42 is located interiorly of the hollow rudder and above housing 42. The door closing means for housing 43 may be located either above or below housing 43 in hollow rudder 9. The door closing means for housing 44 is located below housing 44 in hollow rudder 9. As hereinbefore described in connection with Fig. 1, the control circuits for the driving motors which operate the propellers 45, 46 and 47 and the control means for the door closing and opening mechanism are brought out collectively through the hollow rudder post 7 and connected with the control position of the vessel in order to allow coordinated control of all moving parts. Instead of electric motors, these propellers may be driven by transmission machinery operating by way of hollow rudder-post 7.

Figures 23, 24:
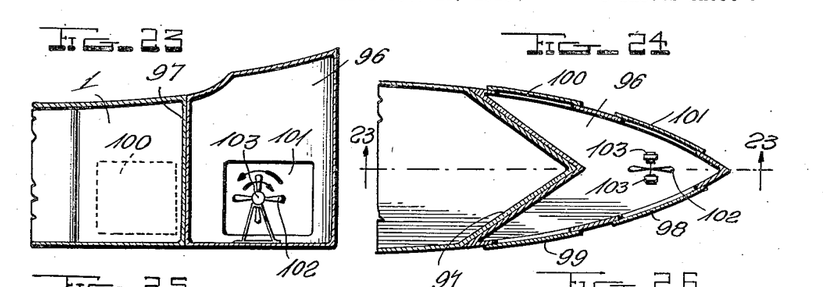
Fig. 23 shows the application of my invention in which the auxiliary propelling mechanism is mounted in a compartment adjacent the prow of a vessel, the view being taken on line 23—23 of Fig. 24.
Fig. 24 is a horizontal sectional view of the form of my invention illustrated in Fig. 23.
Figures 25, 26, 27, 28, 29, 30, 31:
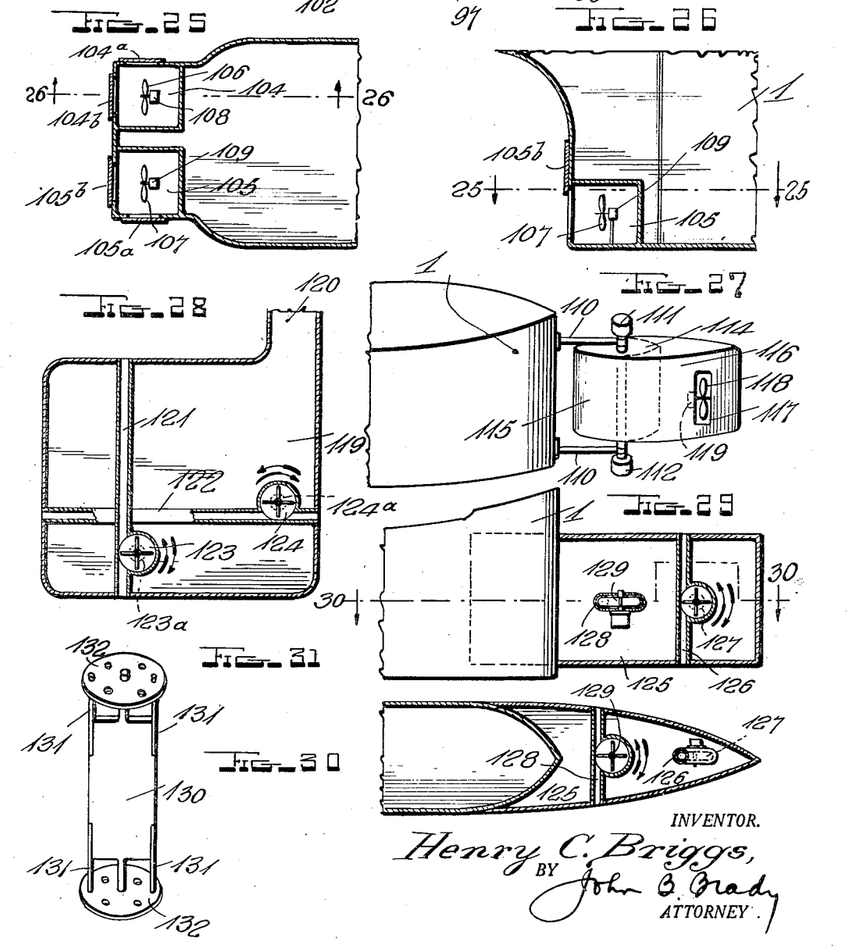
Fig. 25 illustrates the application of my invention in a system of compartments located adjacent the stern of a vessel, the view being taken on line 25—25 of Fig. 26.
Fig. 26 is a longitudinal sectional view taken on line 26—26 of Fig. 25.
Fig. 27 shows my invention applied to a hollow rudder adapted to be connected adjacent the bow of a vessel.
Fig. 28 illustrates a hollow rudder equipped with reversible turbines operating in vertically and horizontally disposed conduits extending through the hollow rudder for controlling the displacement of fluid and the navigation of the vessel with which the rudder is associated.
Fig. 29 shows an arrangement of forward bulk head in the prow of a vessel in which fluid displacing conduits are provided, each equipped with reversible turbines for controlling the navigation of the vessel, particularly of the submarine type.
Fig. 30 is a horizontal sectional view taken on line 30—30 of Fig. 29.
Fig. 31 is a perspective view of one form of arrangement for locking various units in the structure of my invention with respect to each other.

In order to afford access to the mechanism within the hollow rudder 9, I provide a removable end wall 48 for hollow rudder 9. The removable end wall 48 is removably secured by means of bolt members 49 with the end wall of the hollow rudder 9. When the vessel is in dry dock, the end wall 48 may be readily removed and access had to the driving motors for oiling and to the sliding doors and control mechanism thereof, for oiling, adjustment, replacement and repair. The dimensions of the hollow rudder 9 are such that access can readily be had through the removable end wall of the rudder for oiling, replacement and repair parts. Where additional access to the mechanism is required, other removable doors may be provided in the hollow rudder. The parts are constructed of non-corrosive materials or are plated against rust or corrosion. The structure back of the propeller may be wedge-shaped, as shown in Figs. 24 and 27, for cutting the water from the propeller and displacing it to the sides.

I have heretofore described that type of auxiliary propeller which is driven in a fixed plane normal to the plane of the hollow rudder. When the system of my invention is applied to submarines or aircraft, it becomes necessary to orient the plane of movement of the propeller in order to render the propeller effective for producing upward or downward movement of the submarine or aircraft. In Figs. 8-12, I have illustrated one arrangement for orienting the propeller for use on surface vessels. In Figs. 13-20, I have illustrated other arrangements for orienting the plane and path of movement of the propeller.

Referring more particularly to Figs. 8-12, I have shown the hollow rudder 9 provided with an interiorly arranged frame structure 50 supporting the annular frame 51 in which the angularly shiftable frame carrier 52 is pivotally mounted on a substantially vertical axis provided by journals 55 extending from frame carrier 52 into the annular frame 51. A four blade propeller 53 is mounted for rotation within the shiftable frame carrier 52 under control of electrically operated driving motors 54. Driving motors 54 have flexible leads extending therefrom through the hollow rudder and through the tubular rudder post to the control position. The flexible leads allow displacement of the motors 54 for a sufficient angular distance to allow the propeller to be readily adjusted to the selected operating plane. In order to adjust the shiftable frame carrier 52 from a remote control position, I provide a gear 56 connected to one of the pivot members which extend from the shiftable frame carrier 52. A pinion 58 meshes with gear 56 and is adjustable through control shaft 59 for moving driving gear 56. The conductors leading to the motors 54 are collected and carried through conduit 57 to the control position.

The rudder construction illustrated in Figs. 8-12 is provided with an arrangement of door closures similar to the arrangement described in connection with Figs. 1–7. That is, sliding doors 60 are confined to move in guide rails 60a under control of pinions 60c which mesh with rack teeth 60b formed in the doors 60. The pinions 60c are carried by drive shaft 61 which is driven through pinions 62 through an adjustable control shaft 63 operative from the control position.

Figures 10, 11:
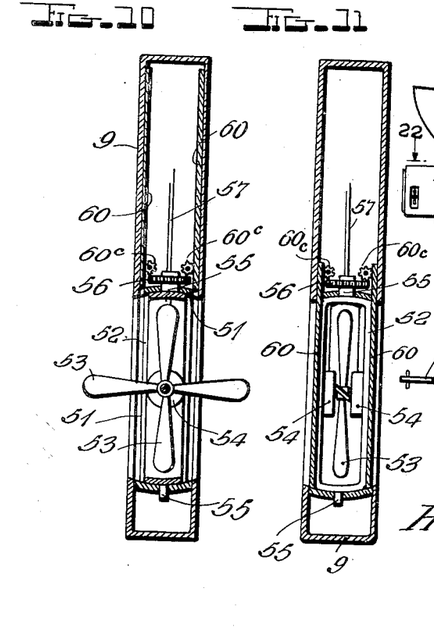
Fig. 10 is a vertical transverse section on line 10—10 of Fig. 9 showing the propelling mechanism in operating position.
Fig. 11 shows the housing in the hollow rudder closed by sliding doors and the propelling mechanism wholly enclosed within the hollow rudder.
Figures 12, 16:
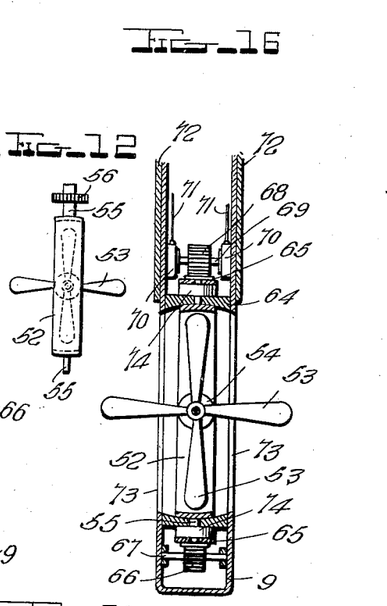
Fig. 12 is a view illustrating the manner of supporting the propeller in the frame carrier adapted for orientation with respect to the plane of the rudder.
Fig. 16 illustrates a transverse sectional view through the rudder and illustrating the compartment in the rudder open and showing the propelling mechanism moved to operating position.
Figure 13:
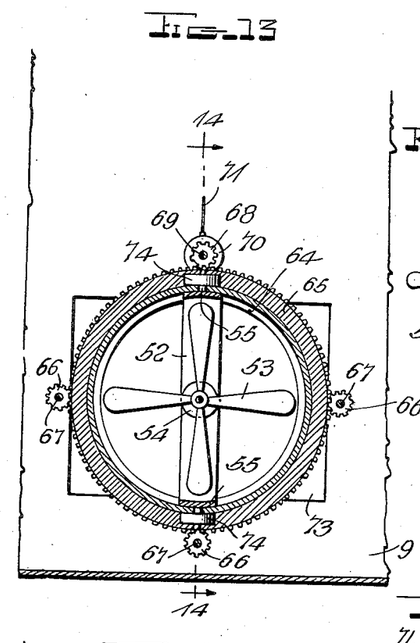
Fig. 13 shows a further modification of the orientation means for the propelling mechanism in the hollow rudder.
Figures 14, 15:
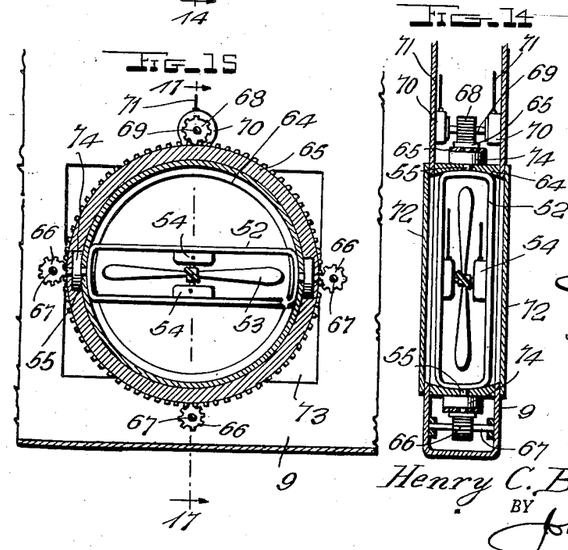
Fig. 14 is a transverse vertical section through the orientation mechanism of Fig. 13 and illustrating the propeller housed within the hollow rudder in closed position.
Fig. 15 illustrates the propelling mechanism of Fig. 13 with the propeller oriented in a horizontal position in a plane normal to the plane of the rudder.
Figure 17:
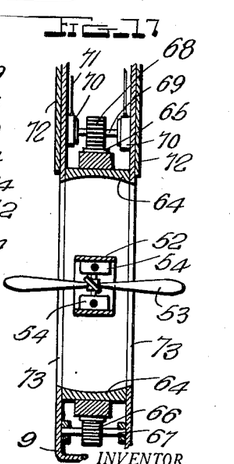
Fig. 17 is a vertical sectional view taken on line 17—17 of Fig. 15 and shows the propeller arranged in a horizontal plane.

It will be seen that the entire shiftable frame carrier 52 is controllable in position to selectively determine the plane of movement of the propeller 53 with respect to the plane of the rudder. The ability to selectively determine the plane of operation of propeller 53 is highly important in the maneuvering of vessels within limited areas. When it becomes desirable to close the housing, propeller 53 is angularly shifted by moving shiftable frame carrier 52 until the blades of the propeller lie wholly within the confines of the side walls of the hollow rudder at which time, sliding doors 60 may be closed by operation of control shaft 63, operating gear system 62 from the remote position, moving pinions 60c which engage rack teeth 60b for effecting the closing of the sliding doors 60 as illustrated in Fig. 11.

As heretofore pointed out, it becomes necessary in certain applications of my invention, particularly in submarines and aircraft, to provide for the orientation of the propeller in horizontal planes. Figures 13–20 illustrate forms of my invention in which a substantially universal adjustment of the propeller 53 is possible. In this arrangement I provide an annular frame 64 serving as a mounting means for the shiftable frame carrier 52. The annular frame 64 is connected with the rotatable gear structure 65 which is mounted for rotary adjustment interiorly of the hollow rudder 9. That is to say, I provide stabilizing pinions 66 mounted on shaft members 67 which are journaled laterally of the hollow rudder 9. The stabilizing pinions 66 mesh with the gear teeth formed on the perimeter of the rotatable gear 65. Rotary movement is imparted to gear 65 by means of a drive gear 68 which is carried by a shaft 69, which is in turn driven by motors 70 mounted interiorly of the hollow rudder 9 or mechanically by transmission machinery operating by way of hollow rudder-post 7. Wherever I have mentioned electric motors or orientation control boxes, for either orientation or driving purposes, I do not intend to preclude the use of transmission machinery in cases where it might be practicable to employ such. It will be observed that conductors 71 extend from motors 70 for controlling the electrical energy supplied to motors 70 from the control position. An arrangement of sliding doors 72 is provided for closing the apertures 73 in hollow rudder 9. The mechanism for operating sliding doors 72 is similar to the mechanism hereinbefore described and repetition here is unnecessary.

Movement of the rotatable gear 65 permits the adjustment of propeller 53 through a wide range of horizontal positions. In order to orient the propeller 53 after the proper horizontal plane of operation is selected, I provide orientation control boxes 74 connected with the journals 55 of the shiftable frame carrier 52.

Figures 36, 37, 38, 39, 40:
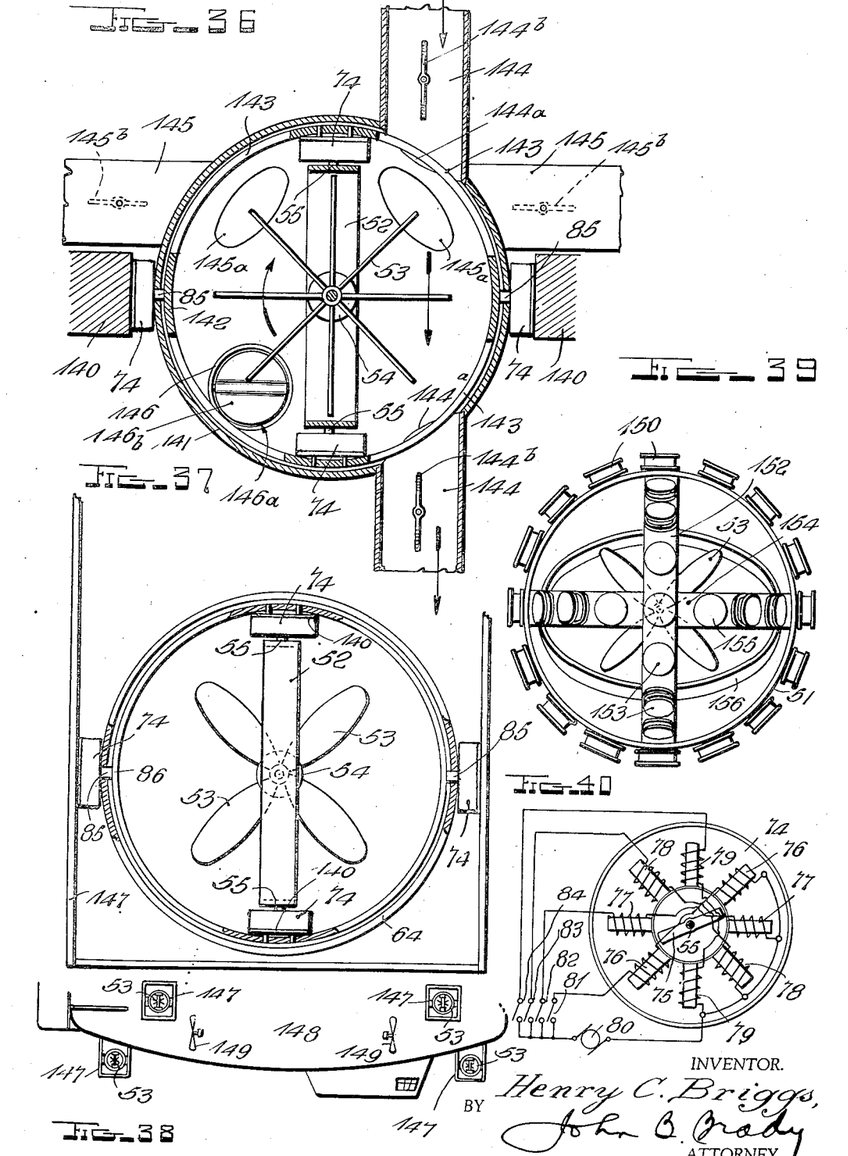
Fig. 36 shows an application of my invention to a navigating apparatus for submarines or aircraft in which the flow of fluid medium in confined paths in three dimensions may be controlled for facilitating the navigation of the vessel.
Fig. 37 illustrates an application of the mechanism of my invention to aircraft navigation.
Fig. 38 shows the manner of applying the auxiliary propelling mechanism to dirigible balloons.
Fig. 39 illustrates an electromagnetic control system for governing the orientation of the propelling mechanism in three dimensional space.
Fig. 40 illustrates one form of electromagnetic adjusting mechanism which may be employed for controlling the orientation of the propelling mechanism in accordance with my invention.

In order to more fully disclose the structure of the orientation control boxes 74, reference is made to Fig. 40 from which it will be observed that each orientation control box 74 includes a magnetic armature 75 extending laterally of the journal member 55. The magnetic armature 75 is free to be angularly shifted step by step under control of sets of radially arranged electromagnets which I have indicated at 76, 77, 78 and 79. The sets of radially disposed electromagnets are mounted around the path of movement of magnetic structure 75. The leads from each orientation control box extend from the control box through flexible connectors and through the hollow rudder post of the rudder to the control position. In Fig. 40, I have represented the source of operating potential by reference character 80 common to all of the sets of electromagnets 76, 77, 78 and 79. The magnets are selected by means of circuit controllers 81, 82, 83 or 84. The circuit controllers may be progressively actuated at the control position for progressively stepping the frame carrier 52 into the desired position for operation of the propeller 53. Mechanical interlock devices may be employed for maintaining the carrier 52 in the selected position so that it is not essential to continually excite a selected electromagnetic control circuit. When it is desired to restore the carrier 52 to a position in which the sliding doors of the hollow rudder may be closed, the circuit controllers 81, 82, 83 and 84 may be closed in reverse order for progressively shifting carrier 52 to a position for housing propeller 53 wholly within the confines of hollow rudder 9. Prior to effecting such reversal of movement of carrier 52, the mechanical interlock theretofore maintained in the position of carrier 52, is removed by remote control to allow restoration of the carrier 52 to a position housed within rudder 9.

Figure 18:
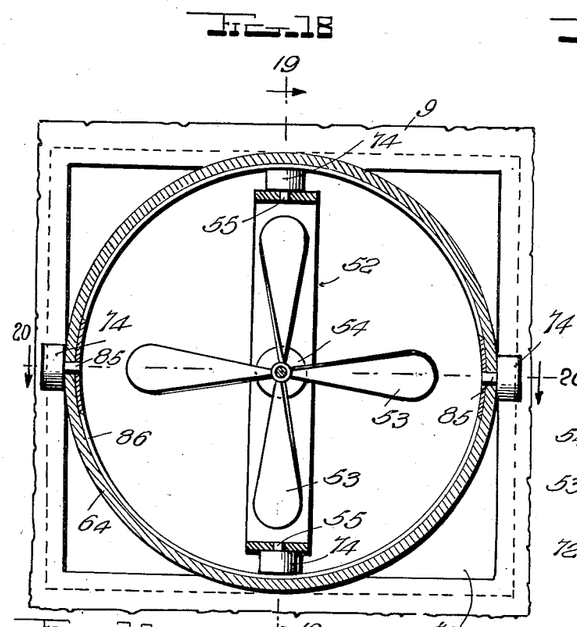
Fig. 18 illustrates a further modified form of orientation control mechanism for the auxiliary propeller in which the plane of operation of the propeller is controlled by electromagnetic devices.
Figure 19:
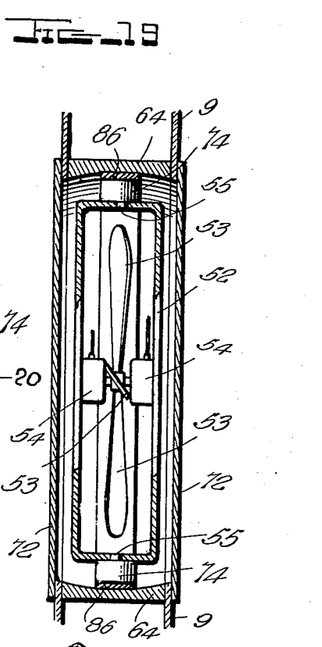
Fig. 19 is a vertical sectional view taken on line 19—19 of Fig. 18.
Figure 20:
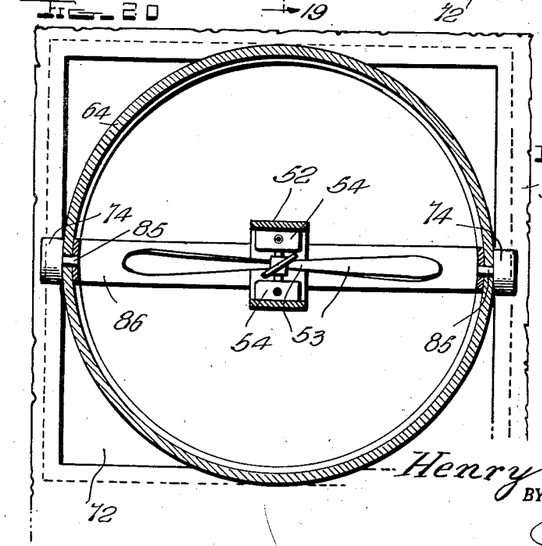
Fig. 20 is a horizontal sectional view taken on line 20—20 of Fig. 18.

Figs. 18–20 show a modified form of my invention in which the orientation of the plane of the propeller is simplified by employing orientation control mechanism for governing the movement of the propeller 53 in both the vertical and horizontal planes by electrical means. I arrange a pair of orientation control boxes 74 in diametrically opposite positions within the frame structure of the hollow rudder and extend the rotatable control members 85 thereof through the annular frame 64 to a position in which the members 85 connect with the angularly shiftable circular frame 86. The circular frame 86 is adjustable through various planes from the vertical passing through a horizontal position. The circular frame 86 provides the supporting means for the orientation control mechanism 74, which in turn supports and controls frame carrier 52. As heretofore explained, the frame carrier 52 provides mounting means for driving means 54 and propeller 53. The circuits leading to the orientation control boxes 74 extend through flexible leads to the control position for operation in the manner explained in connection with Fig. 40. Thus, it will be seen that when the doors 72 of the hollow rudder 9 are opened by remote control from the control position, the propeller 53 may be shifted to selected positions in vertical and horizontal planes. The control switches 81, 82, 83 and 84 for each of the sets of orientation control boxes are coordinated and suitably marked so that the operation of associated orientation control boxes may be selectively timed.

Figure 21:
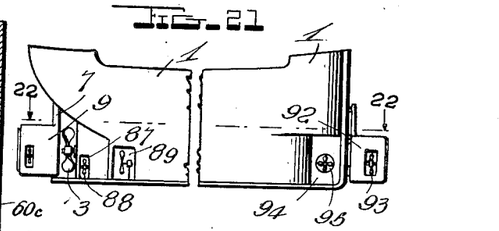
Fig. 21 is a side elevation of a vessel in which both the bow and stern are equipped with the auxiliary propelling mechanism of my invention for the purpose of warping the vessel into dock or facilitating the turning of the vessel within a small area.
Figure 22:
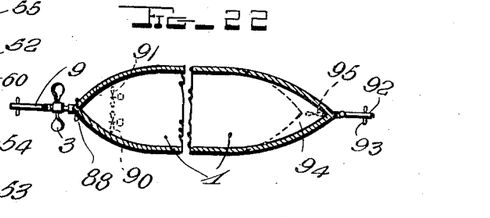
Fig. 22 is a horizontal sectional view taken on line 22—22 of Fig. 21.

The maneuvering propeller may be located in various positions with respect to the hull of the vessel. For examples illustrated in Figs. 21 and 22, the propeller mechanism as heretofore described, may be housed in the hollow rudder 9 with respect to the hull of the vessel 1, and coordinated for operation with respect to the main propeller 3 and, in addition, other maneuvering propellers may be provided. In order to illustrate the several embodiments of my invention I have illustrated in Figs. 21 and 22, an auxiliary propeller compartment in the skeg, as shown at 87 in Fig. 21, in which auxiliary propeller 88 is housed. To further facilitate the maneuverability of the vessel, I may provide a compartment 89 in the stern of the vessel in which a pair of auxiliary propellers 90 and 91 are symmetrically arranged. Moreover, a rudder may be provided forward of the vessel, as indicated at 92. For additional control of the vessel, a compartment may be provided in the prow of the vessel, as indicated at 94, in which auxiliary propeller 95 is located. It will be understood that separate controls extend from the several auxiliary propellers to the control position aboard the vessel and the operation coordinated so that the maneuvering of a vessel of large size, is greatly simplified. A vessel of large size, of the order of 37,000 tons, driven by 200,000 horse power engines may be maneuvered quickly and within a smaller area to change the course of the vessel, thus increasing the safety of life and property.

In order to secure maximum effectiveness of the auxiliary propeller mechanism, I may provide a compartment 96 in the prow of the vessel, as represented in Figs. 23 and 24. The compartment 96 is watertight and has a substantially wedge-like inner wall which cuts the water as it comes from the auxiliary propellers and throws it to the sides. The wall however may extend laterally of the vessel or be provided with some other convenient shape. I provide a pair of door closures 98 and 99 at the starboard side of the compartment 96 and a pair of door closures 100 and 101 at the port side of the compartment 96. These doors are operative through controls similar to the controls heretofore described for the sliding doors on the hollow rudder. Within the compartment 69, I mount one or more auxiliary propellers as represented at 102 and drive the propellers in a manner similar to a method of drive heretofore explained, such as through motors 103, or by direct mechanical means. A single door may be provided at each side of the compartment, if desired. Various components of maneuvering forces may be obtained by coordinating the drive of the auxiliary propellers in different parts of the vessel.

In Figs. 25 and 26, I have shown methods of arranging the auxiliary propellers in separate compartments in spaced positions in the vessel. Compartments 104 and 105 may be suitably located adjacent the stern of vessel 1. Port compartment 104 and starboard compartment 105 may each be provided with separate door closures 104a, 104b, 105a and 105b which may be opened or closed by remote control, as hereinbefore explained in connection with the sliding doors on the hollow rudder. The compartments 104 and 105 are watertight and may be selectively employed in the maneuvering of the vessel by the selective operation of the auxiliary propellers 106 and 107. Propellers 106 and 107 are operated by suitable drives 108 and 109, controlled from the control position aboard the vessel. I may locate these compartments at the bow, sides, in the stern or in the bottom of the hull of the vessel.

Where it becomes desirable to apply the system of my invention to vessels of existing construction, I may employ the arrangement indicated in Fig. 27. A framework 110 is secured to the forward portion of the vessel 1. The framework 110 supports housings 111 and 112 within which motors are arranged for turning the rudder 114, or the rudder may also be turned by means of a quadrant connected with the upper end of the rudder post for operation from tiller cables leading to the wheel house. The rudder 114 is provided with a rearward extension 115 and a forward compartment 116. In the forward compartment of the rudder 114 there is an open housing 117 provided with doors as hereinbefore described within which the auxiliary propeller 118 is mounted. The auxiliary propeller 118 is driven by a motor indicated at 119 connected through leads which are supported by the frame 110 and lead to the control position aboard the vessel.

In lieu of the propellers heretofore described, I may employ turbines arranged in various positions as represented in Figs. 28-30 and 32-35. In Fig. 28, I have shown a hollow rudder 119, which may be angularly shifted under control of rudder post 120. Tubular conduit 121 extends vertically from top to bottom, and tubular conduit 122 extends horizontally from front to back through the hollow rudder 119. A turbine is interposed in the path of each of the tubular conduits. Turbine 123 is located in conduit 121. Turbine 124 is located in conduit 122. The turbines 123 and 124 are driven by electrical motors indicated at 123a and 124a or other driving means or are driven through rotary shafts extending through hollow rudder post 120 from the driving means interiorly of the vessel. The motors 123a and 124a or other driving means may be selectively started and stopped for driving the turbines in accordance with the required maneuvering of the vessel. The motors 123a and 124a or other driving means are quickly reversible so that the displacement of the fluid through the rudder structure may be instantly controlled.

Figs. 29 and 30 illustrate one manner of applying the turbine control mechanism to the bow of a vessel. In this arrangement a frame structure or casing 125 is attached to the bow of vessel 1. The casing 125 is provided with fluid displacing conduits extending in predetermined directions. In the modification illustrated the frame 125 is applied to the bow of a submarine so that the conduits are arranged to facilitate upward and downward movement of the bow of the vessel and otherwise increase the dirigibility of the vessel. The vertical fluid displacing conduit is indicated at 126 with turbine 127 disposed in the path thereof. The laterally extending fluid displacing conduit is indicated at 128 having turbine 129 disposed in the path thereof. The driving motors may be controlled from the control position for determining the amount of water pumped through the conduits and correspondingly governing the dirigibility of the vessel.

In Fig. 31, I have shown one form of bolting device as illustrative of one of many forms of locking mechanism for securing the frame work of the compartments, rudder and positions of the bulkheads together. The frame work has been represented at 130 having bolts 131 extending therefrom and entering predetermined perforations in discs 132. The bolting device may be used in various positions for maintaining various parts of the structures hereinbefore described in fixed relation.

Figures 32, 33, 34, 35:
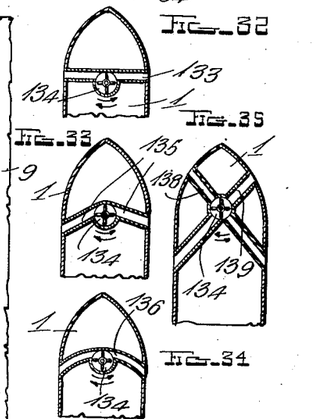
Fig. 32 shows a method of facilitating navigation of a vessel by displacing the water laterally through a conduit extending through the hull of the vessel.
Fig. 33 illustrates my invention applied to the hull of a vessel in which water may be displaced through conduits which extend at obtuse angles with respect to the beam of the vessel in the direction of the stern of the vessel.
Fig. 34 shows an arrangement of curved conduit extending through the hull of a vessel and through which water is displaced in a curved path having a center toward the stern of the vessel.
Fig. 35 illustrates the application of my invention to the hull of a vessel in which the control conduits extend diagonally from side to side.

The displacement of the water through the maneuvering device may be effected in a variety of ways. In Fig. 32, I have shown the water conveying conduit 133 extending laterally across the bow of the vessel 1 with turbine 134 interposed in the path of the conduit. In Fig. 33, I have shown a conduit extending through the bow of the vessel as indicated at 135 but inclined toward the stern of the vessel at obtuse angles with respect to the beam of the vessel. In Fig. 34, I have shown the conduit curved at 136 concentrically with a center indicated toward the stern of the vessel. In Fig. 35, I have shown conduits 138 and 139 extending diagonally from side to side of the vessel. All of these conduits are independent. At the stern, the conduit shown in Fig. 33 may be inclined toward the bow, and that shown in Fig. 34, may be curved toward the bow of the vessel. These maneuvering turbines may be located at the bow, sides amidships, stern or bottom of the hull for developing components of forces for the precise maneuvering of the vessel. For example, by driving the turbine on one side forward and the one on opposite side in reverse, this would serve to produce a steady twist, and turn the vessel coordinately with the turbines at bow, stern and amidships. Likewise, turbines in spaced positions at bottom of vessel would operate coordinately to the same purpose.

In applying the principles of my invention for the improvement of dirigibility of submarines or aircraft, I may employ the arrangement illustrated in Fig. 36.

In this modification of my invention, the propeller mechanism is supported by a suitable frame 140 which supports diagrammatically opposite orientation control boxes 74 of the construction heretofore described and shown in Fig. 20. The orientation control boxes 74 have their operating shafts 85 extending through the spherical housing 141 and connected to the ring member 142. Ring member 142 may be oriented through varying angles under control of orientation control mechanism 74 in much the same manner as ring member 86 in the construction illustrated in Figs. 18-20. However, because of the coaction of the ring member 142 with associated parts of the spherical casing 141, portions of the ring member 142 are slotted or formed into narrow arms as represented at 143 so as not to offer any obstruction to the passage of the fluid medium through the spherical housing 141, as will hereinafter be described in more detail. Contiguous with spherical housing 141, I provide vertically and laterally extending conduits 144, 145 and 146, respectively. The conduits terminate in the walls of the spherical housing 141. I have shown the connection between conduit 144 and spherical housing 141 through apertures 144a. I have shown the connection between conduit 145 and spherical housing 141 through apertures 145a. I have shown the connection between conduit 146 and spherical housing 141 through apertures 146a. Thus a vertical and horizontal path for the ingress and egress of the fluid medium through the spherical housing 141 is provided. The intake and discharge of the fluid medium through the conduits 144, 145 and 146 is regulated by valves 144b, 145b and 146b, respectively.

Ring member 143 carries a pair of orientation control devices 74 similar in arrangement to the corresponding mechanism shown in Figs. 18-20, in which journals 55 of frame carrier 52 are mounted. Propeller 53 having the blades thereof suitably modified to meet the requirements in the undersea and aircraft devices, is driven by suitable motors indicated at 54, in a manner similar to the other forms of my invention. It will be seen that a three dimensional control of the ingress and egress of water or air is precisely controlled in the enclosed spherical structure of Fig. 36.

In applying the principles of my invention for improving the dirigibility of air craft, I mount a mechanism very similar to the mechanism illustrated in Figs. 13-17 or Figs. 18-20, on a frame structure 147, as illustrated in Fig. 37. The frame structure 147 is applied forward and aft of the dirigible balloon as represented at 148, in Fig. 38, for controlling the angle of elevation of the balloon as well as improving its dirigibility to left and right. Corresponding sets of maneuvering devices are mounted in frame 147 on opposite sides both forward and aft, at or near the upper portions of the car (or cars). These additional maneuvering devices are located with respect to the balloon wholly out of the path of the main propellers 149 and serve to assist in maneuvering the balloon in the required position. Controls for each of the maneuvering devices are taken to the control position aboard the control car and by coordination of the operation of the several devices, the craft may be steered with a high degree of precision. It will be understood that all of the auxiliary propellers 53 are universally adjustable in lateral and horizontal planes. In certain structures it is desirable to increase the accuracy of the process of adjustment of the positions of the propelling devices, and for this purpose I provide the arrangement illustrated in Fig. 39.

Referring to Fig. 39, I have shown an electromagnetic method of control for orienting the position of the auxiliary propeller 53. I provide a substantially equatorial arrangement of electromagnets 150 which are connected through individual circuit leads to the control position by which the series of magnets may be sequentially energized for controlling the position of the magnetic supporting member 151. Mounted within magnetic supporting member 151, I provide an independent supporting member 152 carrying a plurality of electromagnets 153, which may likewise be progressively energized from the control position for shifting ring member 152 to the desired position. Interiorly of ring member 152, I provide an additional magnetic ring member 154 carrying electromagnets 155, which may be progressively energized in a manner similar to the energization of the sets of electromagnets 150 and 153, whereby movement of ring member 154 may be selectively controlled. The propeller 53 is mounted within ring member 156 and is driven as heretofore described, or the propeller itself may be driven by one or another of the belts of electromagnets when in the proper position. The excitation of the proper magnets will swing the rings into selected positions for controlling the maneuverability of the propelling mechanism. The control circuits for the several electromagnetic devices, are similar to the circuits illustrated in Fig. 40.

Where the mechanism of my invention is applied to naval vessels subject to the destruction of war, I provide, in addition to the mechanism heretofore explained, tough metal screens for the protection of the auxiliary propellers. Moreover, the sliding doors in the compartments and rudder, used in association with the auxiliary propellers, are in such instances, constructed from armor plate for increasing the protection of the auxiliary propeller mechanism against torpedo fire.

Under circumstances where a high degree of protection is offered under the auxiliary propellers, they may be saved for propulsion of the vessel in the event that the main propellers are destroyed by gun or torpedo fire.

I have described certain embodiments of my invention. However, because of the wide application and high degree of usefulness of my invention, I realize that many modifications of my invention may be made, many of which I now contemplate. Accordingly, I desire that it be understood that the description of my invention presented herein shall be considered in the illustrative sense and that no limitations upon my invention are intended other than are shown by the scope of the appended claims.

What I claim and desire to secure by Letters Patent of the United States is as follows:

1. Mechanism for controlling the movement of vessels comprising a hollow rudder, means connected with said rudder for angularly adjusting said rudder in selected vertical planes, a laterally extending housing in said rudder, an auxiliary propeller journaled within said housing, means within said rudder for rotatably driving said auxiliary propeller, doors associated with the side walls of said hollow rudder for closing or opening said laterally extending housing and means extending through said first mentioned means for shifting said doors into open or closed position for rendering said propeller effective or ineffective.

2. Mechanism for controlling the movement of vessels comprising a hollow rudder, means connected with said rudder for angularly adjusting said rudder in selected vertical planes, a laterally extending housing in said rudder, a propeller, means for rotatably mounting said propeller within said housing, means for driving said propeller and means operative through said first mentioned means for adjusting the plane of operation of said propeller through both vertical and horizontal positions.

3. Mechanism for controlling the movement of vessels comprising a hollow rudder, means connected with said rudder for angularly adjusting said rudder in selected vertical planes, a laterally extending housing in said rudder, a propeller, means for rotatably mounting said propeller, means for driving said propeller, electromagnetic means for adjusting the plane of operation of said propeller through both vertical and horizontal positions and means extending through said first mentioned means for controlling the operation of said electromagnetic means.

4. Auxiliary maneuvering apparatus for ships which comprises a rudder, a vertically extending conduit connected with said rudder for angularly adjusting the effective position of the rudder, propeller means arranged within the rudder, adjusting means for determining the angular relation of said propeller means with respect to said rudder for directing a thrust from said propeller means at various angles with respect to the rudder and the ship and means extending through said conduit for controlling the operation of said adjusting means.

5. Auxiliary maneuvering apparatus for ships as set forth in claim 4 and including closure means adjustably movable to streamline position with respect to said rudder and enclosing said propeller means for normal propulsion and steerage of the ship and means extending through said conduit for variably controlling the operation of said closure means.

6. Mechanism for controlling the movement of vessels comprising a hollow rudder, a hollow rudder post connected with said rudder for angularly adjusting said rudder in selected vertical planes, a laterally extending housing in said rudder, an auxiliary propeller journaled within said housing, means within said rudder for rotatively driving said auxiliary propeller, means for orienting said propeller into position for effective operation, means for closing or opening said laterally extending housing and means extending through said hollow rudder post for controlling the operation of all of the aforesaid means.

7. Mechanism for controlling the movement of vessels comprising a hollow rudder, a hollow rudder post for pivotally mounting said rudder and angularly movable for adjusting said rudder in selected vertical planes, a laterally extending housing in said rudder, a two-bladed auxiliary propeller journaled within said housing, means within said rudder for rotatively driving said auxiliary propeller, means for bringing said propeller to rest in a position for housing, doors associated with the side walls of said hollow rudder for closing or opening said laterally extending housing, means for shifting said doors into open or closed position for rendering said propeller effective or ineffective and means extending through said hollow rudder post for controlling the operation of all of the aforesaid means.

8. Mechanism for controlling the movement of vessels comprising a substantially hollow rudder, means for angularly adjusting said rudder in selected vertical planes, a laterally extending housing in said rudder, a frame member journaled centrally within said housing on an axis extending centrally through said rudder, propeller means journaled in said frame member, means for selectively orienting said frame member to a position displaced from the normal position thereof for shifting said propeller to selected planes from a plane coincident with a plane passing through the central axis of said rudder to a plane normal to the plane of the rudder.

9. Mechanism for controlling the movement of vessels comprising a substantially hollow rudder, means for angularly adjusting said rudder in selected vertical planes, a laterally extending housing in said rudder, a frame member journaled centrally within said housing on an axis extending centrally through said rudder, propeller drive means carried by said frame member, a propeller journaled in said frame member and connected with said propeller drive means, means for selectively orienting said frame member to a position displaced from the normal position thereof for shifting said propeller to selected planes from a plane wholly within said housing to a position normal to the plane of said rudder.

10. Mechanism for controlling the movement of vessels comprising a substantially hollow rudder, means for angularly adjusting said rudder in selected vertical planes, a laterally extending housing in said rudder, a frame member journaled centrally within said housing on an axis extending centrally through said rudder, a propeller journaled in said frame member, means within said substantially hollow rudder for adjusting said frame member to selected positions within a range of substantially 360°, means for selectively orienting said frame member in various angular positions to move said propeller from a frame wholly within said rudder to a plane normal to the plane of said rudder, and means for driving said propeller.

11. Mechanism for controlling the movement of vessels comprising a substantially hollow rudder, means for angularly adjusting said rudder in selected vertical planes, a laterally extending housing in said rudder, a frame member journaled centrally within said housing on an axis extending centrally through said rudder, a propeller journaled in said frame member, means within said substantially hollow rudder for adjusting said frame member to selected positions within a range of substantially 360°, means for selectively orienting said frame member in various angular positions to move said propeller from a plane wholly within said rudder to a plane normal to the plane of said rudder, and drive means mounted within the confines of said substantially hollow rudder for driving said propeller.

HENRY C. BRIGGS.